United States Patent Office 3,407,208
Patented Oct. 22, 1968

3,407,208
RECOVERY OF CARBAZOLE FROM COAL TAR FRACTIONS
Louis A. Joó, Johnson City, and Harvey J. Young, Elizabethton, Tenn., assignors to Great Lakes Carbon Corporation, New York, N.Y., a corporation of Delaware
No Drawing. Filed Dec. 30, 1965, Ser. No. 526,930
4 Claims. (Cl. 260—318)

ABSTRACT OF THE DISCLOSURE

Carbazole of a purity sufficient to reach a level of 95+% with one recrystallization is obtained in good yield by lixiviating the bulk of the impurities from an anthracene-poor cake containing as little as 15% carbazole, with a halogenated hydrocarbon liquid having a boiling point not higher than about 200° C. One treatment at 50 to −10° C. at a solvent to cake ratio of 1 to 15:1 suffices. The 15% carbazole cake is previously obtained by a low temperature leaching of crude "anthracene salts" according to the method of U.S. Patent 3,285,987.

---

The present invention relates to a method for recovering carbazole from coal tar distillates. More particularly, it relates to a simple process based on selective solubility in halogenated hydrocarbon liquids, said process giving a good yield of carbazole at high purity and low cost.

Carbazole is a useful and important compound in the synthesis of dyes and fungicides, in the manufacture of certain polymers such as vinyl carbazole and as a reagent for lignins, carbohydrates and formaldehyde. Although several syntheses of the compound have been devised, the most important source for its preparation remains coal tar. The distillation of coal tar yields "anthracene oil," also called "green oil," which constitutes approximately 9% of the tar. It has a boiling range of about 300–360° C. On standing, this oil deposits "anthracene salts," which are separated by filter pressing or by centrifuging. These salts consist principally of varying amounts of anthracene, carbazole, phenanthrene and acridine as well as smaller amounts of other related materials. The carbazole content of anthracene salts can vary between 5 and 20% by weight depending on the nature of the coal and on the process employed to obtain the original tar and the anthracene salts. These anthracene salts then are the raw materials on which our recovery method shall be applied.

There is no standard method for the separation of carbazole from the compounds with which it is mixed in anthracene salts or cake. There has been used for this purpose various techniques and combinations of techniques such as selective extraction with organic or inorganic solvents, fractional distillation and chemical separation.

According to one method, for instance, the anthracene cake is first allowed to react with an alkali metal hydroxide such as sodium or potassium hydroxide, thus forming the potassium or sodium salt of carbazole. The unreacted cake components, i.e., anthracene, phenanthrene, etc., are then distilled off and the residual carbazole salt is purified and subsequently acidified to liberate the carbazole. The carbazole thus obtained is extracted and recrystallized. This method while theoretically simple suffers from several disadvantages, of which the principal ones are the unavoidable use of unrecoverable chemicals and the formation of carbonaceous material by cracking during the distillation step. Another method concerns itself with the extraction of carbazole by concentrated sulfuric acid. This method also has several drawbacks. It uses too much sulfuric acid. In addition, the presence of large quantities of concentrated sulfuric acid poses problems of equipment construction, recovery and reconcentration of the sulfuric acid and disposal of polymeric impurities resulting from the sulfonation of carbazole and other materials present in anthracene cake.

The fractional distillation of anthracene cake components for the recovery of carbazole is not very satisfactory because of the closeness in boiling points of all the components of anthracene cake as well as the similarities in other properties of said components.

A few methods based on selective extraction of anthracene salts components are known but as far as the production of carbazole is concerned, they are generally inadequate, having been devised specifically for the extraction of the most important component of the mixtures, anthracene. What has specifically been done for the recovery of carbazole too often involves either a complex series of extractions, the use of relatively expensive solvents such as those containing the furane ring and organic bases, or a combination of solvent extraction with some other physical or chemical process such as fractional distillation and the formation of a carbazole salt. It is not surprising therefore that under such circumstances no method has clearly succeeded in dominating what remains an essentially empirical field.

In an earlier application filed on Feb. 8, 1965, Ser. No. 431,200, now U.S. Patent 3,285,987, there was disclosed a process for the recovery of anthracene from anthracene cake. The process consisted simply in extracting the non-anthracene components from the anthracene cake at a temperature (T) in the range of 20° C. to −50° C. in combination with a ratio (R) of solvent to anthracene cake of 2:1 to 19:1 by weight so that the percent yield (Y) approaches the percent purity (P), R and T being so correlated that $0.25 < P^2Y < 0.73$. In this manner, using such solvents as have previously served in the extraction or leaching of impurities from anthracene cake, e.g., aromatic hydrocarbons, heterocyclic compounds, ketones, ethyl esters of saturated acids having less than 4 carbon atoms and mixtures of these and other solvents, there was obtained, in one operation, residues of anthracene containing as much as 75% of the total weight of anthracene present in the anthracene cake and this at a purity as high as 85%. According to the art that had existed heretofore, any attempt to recover anthracene from such crude material as anthracene salts or cake was handicapped by the necessity of sacrificing either the yield in order to obtain high purity or the purity in order to obtain high yield. This is no longer the case.

It has now been discovered that if the solvent is removed from the extract obtained from crude anthracene cake according to the method described in copending application Ser. No. 431,200, now U.S. Patent 3,285,987, and if the anthracene-poor residue thus obtained is eluted at a liquid to cake ratio of 1:1 to 15:1 and at a temperature within the range of about 50 to −30° C. with a halogenated hydrocarbon liquid having a boiling point no higher than about 200° C., there will remain, after the removal of the eluate, carbazole in good yield and of a quality such that it is but one simple recrystallization removed from a 95+% state of purity.

The method employed in the present invention shall be illustrated by the following examples. These are provided as guides in establishing the limits of the invention and are not to be construed therefore as limiting the invention beyond the scope of the appended claims. All percentages and ratios given in these examples and in the claims are on a weight basis unless otherwise noted.

Crude anthracene cake, containing among other materials 32–35% anthracene and 10% carbozole, was extracted with acetone at a solvent to solid ratio of 9:1 at −20° C. The undissolved anthracene was filtered off and constituted about 75–80% of the total anthracene present in a crude cake. It had a purity of 85% and contained less than 3% carbazole.

The acetone was then stripped from the eluate to leave a mushy substance containing 15% carbazole. This substance was subsequently eluted, for example with chloroform and carbon tetrachloride, at room temperature and at the solvent to cake ratios indicated in the following tables (Examples 1 to 11). the undissolved solids consisted principally of carbazole as indicated in the tables, while the extracts constituted considerably enriched phenanthrene sources.

TABLE I

[Solvent: Chloroform]

| Example | Temperature, °C. | Solvent/cake ratio | Carbazole Recovery, Percent | |
|---|---|---|---|---|
| | | | Purity | Yield |
| 1 | 35 | 2.3:1 | 62 | 46 |
| 2 | 25 | 2.3:1 | 53 | 70 |
| 3 | 25 | 4:1 | 69 | 72 |
| 4 | 25 | 9:1 | 83 | 44 |
| 5 | 0 | 9:1 | 80 | 62 |
| 6 | −10 | 9:1 | 60 | 74 |

TABLE II

[Solvent: Carbon tetrachloride]

| Example | Temperature, °C. | Solvent/Cake Ratio | Carbazole Recovery Percent | |
|---|---|---|---|---|
| | | | Purity | Yield |
| 7 | 25 | 2.3:1 | 38 | 76 |
| 8 | 25 | 4:1 | 52 | 84 |
| 9 | 25 | 9:1 | 57 | 75 |
| 10 | 0 | 9:1 | 43 | 83 |
| 11 | −10 | 9:1 | 30 | 76 |

It becomes evident on examination of the above data that the best results are obtained by using chloroform as the eluant, the preferred working temperature and solvent to cake ratio being about −10° to 30° C. and 1:1 to 10:1 respectively.

However, other halogenated liquids can also yield acceptable results when used at temperatures within the general range of 50° to −30° C. and at solvent to cake ratios of 1:1 to 15:1, as was indicated earlier. Among the usable liquids of this nature are such compounds as methylene chloride, ethylene chloride, propylene chloride, trichloroethylene, butyl chloride, cyclohexyl chloride, chlorobenzene, o- and m-dichlorobenzene, monobromobenzene and so on.

It is also evident that for each of these solvents, there will be, within the broad ranges of parameters already established, slight differences in the optimum temperatures and solvent to cake ratios that can be used with each solvent. In the case of carbontetrachloride, for instance, the preferred limits are −10 to 30° C. and 1.5:1 to 12:1.

What is claimed is:

1. In a process for fractionating crude anthracene salts containing about 5 to 20% carbazole by weight, which first comprises the one-step extraction of the nonanthracene components by a solvent selected from the group consisting of aromatic hydrocarbons, heterocyclic compounds, ketones, ethyl esters of saturated acids having less than four carbon atoms and mixtures thereof, at a temperature within the range of 20° to −50° C. at a solvent to cake ratio of 2:1 to 19:1 by weight and with said temperature and ratio being so correlated that 0.25< the product of the square of the purity of the nonextracted anthracene by its yield <0.73: the further one-step elution of the anthracene-poor solids at a solvent to cake ratio of 1:1 to 15:1 by weight at a temperature within the range of about 50 to −30° C., with a halogenated hydrocarbon liquid having a boiling point not higher than about 200° C.

2. The process of claim 1 wherein the halogenated hydrocarbon liquid is selected from the group consisting of methylene chloride, ethylene chloride, propylene chloride, trichloroethylene, butyl chloride, cyclohexyl chloride, chlorobenzene, o- and m-dichlorobenzene, monobromobenzene and mixtures thereof.

3. The process of claim 1 wherein the further elution of the anthracene-poor solids is carried out with chloroform at a solvent to cake ratio of 1:1 to 10:1 and at a temperature of 30 to −10° C.

4. The process of claim 1 wherein the further elution of the anthracene-poor solids is carried out wtih carbon tetrachloride at a solvent to cake ratio of 1.5:1 to 12:1 and at a temperature of 30 to −10° C.

References Cited

UNITED STATES PATENTS 3,285,987  11/1966  Job et al. _____ 260—675
1,672,630  6/1928  Thatcher _____ 260—318

HENRY R. JILES, *Primary Examiner.*

N. S. MILESTONE, *Examiner.*

C. M. SHURKO, *Assistant Examiner.*